United States Patent
Appel et al.

(10) Patent No.: US 6,677,085 B2
(45) Date of Patent: Jan. 13, 2004

(54) ELECTROLYTE SYSTEM FOR LITHIUM BATTERIES, THE USE THEREOF, AND METHOD FOR ENHANCING THE SAFETY OF LITHIUM BATTERIES

(75) Inventors: Wolfgang Appel, Kelkheim (DE); Sergej Pasenok, Kelkheim (DE); Juergen Besenhard, Graz (AT); Lars Henning Lie, Kornsjo (NO); Martin Winter, Seiersberg (AU)

(73) Assignee: Solvay Fluor und Derivate GmbH, Hannover (DE)

( * ) Notice: Subject to any disclaimer, the term of this patent is extended or adjusted under 35 U.S.C. 154(b) by 252 days.

(21) Appl. No.: 09/883,491

(22) Filed: Jun. 19, 2001

(65) Prior Publication Data
US 2002/0034692 A1 Mar. 21, 2002

Related U.S. Application Data

(63) Continuation of application No. PCT/EP99/09900, filed on Dec. 14, 1999.

(30) Foreign Application Priority Data

Dec. 19, 1998 (DE) .......................... 198 58 924

(51) Int. Cl.$^7$ ............................. H01M 6/16; H01M 6/04
(52) U.S. Cl. ...................... 429/341; 429/199; 429/200; 429/330; 429/331; 429/326; 29/623.1
(58) Field of Search ................................. 429/341, 199, 429/200, 330, 331, 326; 29/623.1

(56) References Cited

U.S. PATENT DOCUMENTS 5,219,683 A 6/1993 Webber ...................... 429/197

FOREIGN PATENT DOCUMENTS

| EP | 807 986 | 11/1997 |
|---|---|---|
| EP | 948 073 | 10/1999 |
| WO | WO 97/44842 | 11/1997 |
| WO | WO 98/57385 | 12/1998 |

OTHER PUBLICATIONS

Lie et al. "Fluorinated Organic Solvents in Electrolytes for Lithium Ion Cells", ITE Battery Letters, vol. 1, No. 1 (1999), pp. 105–109.*

Patent Abstracts of Japan, vol. 18, No. 221, Apr. 20, 1994, Abstract of JP 06–020719.

* cited by examiner

Primary Examiner—Laura Weiner
(74) Attorney, Agent, or Firm—Crowell & Moring LLP

(57) ABSTRACT

An electrolyte system for lithium batteries with enhanced safety. The system contains at least one conductive salt containing lithium and at least one electrolyte liquid. The electrolyte liquid contains an effective amount of a partially fluorinated compound derived from a diol corresponding to the formula (I):

$$R^1CO\text{—}O\text{—}[CHR^3(CH_2)_m\text{—}O]_n\text{—}R^2 \qquad (I)$$

in which $R^1$ is a $(C_1–C_8)$-alkyl or $(C_3–C_8)$-cycloalkyl group, and each $R^1$ group is partially fluorinated or perfluorinated so that at least one hydrogen atom of the group is replaced by fluorine; $R^2$ is a $(C_1–C_8)$-alkylcarbonyl or $(C_3–C_8)$-cycloalkylcarbonyl group, and each $R^2$ group may optionally be partially fluorinated or perfluorinated; $R^3$ is a hydrogen atom or a $(C_1–C_8)$-alkyl or $(C_3–C_8)$-cycloalkyl group; m is 0, 1, 2 or 3; and n is 1, 2 or 3.

19 Claims, 1 Drawing Sheet

Charging/Discharging Cycles

ELECTROLYTE SYSTEM FOR LITHIUM BATTERIES, THE USE THEREOF, AND METHOD FOR ENHANCING THE SAFETY OF LITHIUM BATTERIES

CROSS REFERENCE TO RELATED APPLICATIONS

This application is a continuation of international application no. PCT/EP99/09900, filed Dec. 14, 1999, designating the United States of America, the entire disclosure of which in incorporated herein by reference.

BACKGROUND OF THE INVENTION

The invention relates to electrolyte systems for lithium batteries with enhanced safety, their use, and a method for enhancing the safety of lithium batteries.

Portable high-value electronic devices, such as mobile telephones, laptop computers, camcorders, etc. are enjoying a very fast growing market. An adequate electrical supply for these devices requires light, high-capacity and high-quality power sources. For environmental and economic reasons, secondary rechargeable batteries are overwhelmingly used. There are essentially three competing systems: nickel cadmium, nickel metal hydride, and lithium ion batteries. An additional interesting field of use for these battery systems could be their use in electrically operated vehicles.

Due to its outstanding performance characteristics, the lithium battery has already acquired large market shares, although it was introduced in the market in its current state of the art only in 1994. Despite the triumphant success of the secondary lithium battery, one cannot overlook the fact that it has safety-related problems:

Rechargeable lithium batteries typically contain a compound of lithium oxide and metal oxide as the cathode (e.g., $Li_xMnO_2$ or $Li_xCoO_2$) and lithium metal as the anode. The lithium is preferably used in the form of an intercalation compound with graphite or with carbon or graphite fibers. An overview of the use of such batteries is given by K. Brandt (Solid State Ionics 69 (1994), 173–183, Elsevier Science B. V.).

According to the current state of the art, the electrolyte liquids, which are used to achieve high conductivity, are preferably solvent mixtures of at least two or more components. The mixture must contain at least one strongly polar component, which due to its polarity has a highly dissociative effect on salts. The polar components that are typically used are ethylene carbonate or propylene carbonate. These highly polar solvents are relatively viscous and have usually a relatively high melting point, e.g., 35° C. for ethylene carbonate.

To ensure adequate conductivity even at lower temperatures of use, one or more low-viscosity components are generally added as "thinners." Typical thinners include, for instance, 1,2-dimethoxyethane, dimethyl carbonate ordiethyl carbonate. Usually the thinners are added in a proportion of 40–60% of the total volume. A serious drawback of these thinner components is their high volatility and their low flash point. 1,2-dimethoxyethane has a boiling point (BP) of 85° C., a flash point (FP) of −6° C., and an explosion limit between 1.6 and 10.4% by volume; dimethyl carbonate has a BP of 90° C., and an FP of 18° C. For these "thinners" there are currently no equivalent substitutes.

Since the electrochemical use of electrolyte solutions and, to a far greater extent, the occurrence of faults (short circuits, overcharging, etc.) always generates heat, this implies—particularly if a cell bursts open and solvent spills—a risk of ignition with the corresponding serious consequences. The currently used systems basically avoid this by using costly electronic controls. Nevertheless, some accidents caused by fire are known to have occurred, particularly during manufacture where large amounts of solvents are handled, but also during the use of rechargeable lithium batteries.

A greater source of risk during use is created in electrical vehicle applications. Here, substantially greater amounts of electrolyte liquid per energy storage device are required, and electronic control of many interconnected cells is far more difficult and involves correspondingly greater risks.

To enhance safety, the cathode and anode space can be separated by a microporous separator membrane, which is made in such a way that the current flow is interrupted by the melting of the pores when a certain temperature limit is exceeded. Suitable membranes of this type are found, for instance, in the Celgard® line of Hoechst Celanese Corporation.

The safety of lithium batteries can be further enhanced by pressure relief devices that respond to gas development if the battery is overcharged and, as mentioned above, by electronic monitoring and control devices.

Also recommended are flame-retardant additives containing phosphorus and halogen, but these often have a negative effect on the performance characteristics of the batteries.

All of these measures, however, cannot exclude the possibility that the highly volatile and flammable "thinner" ultimately may be ignited in case of malfunctions and after rupture of the cell cause a fire that is difficult to control with common extinguishing agents. Burning lithium reacts violently not only with water but also with carbon dioxide, which is used in many fire extinguishers.

The following documents are cited as representative of the prior art:

JP-A-7 249432=D1
EP-A-0 631339=D2
EP-A-0 599534=D3
EP-A-0 575591=D4
U.S. Pat. No. 5,169,736=D5
B. Scrosati, ed., 2nd International Symposium on Polymer Electrolytes, Elsevier, London and New York (1990)=D6
U.S. Pat. No. 5,393,621=D7
JP-A-06020719=D8
U.S. Pat. No. 4,804,596=D9
U.S. Pat. No. 5,219,683=D10
JP-A-5 028822=D11, and
EP-A-0-821368=D12.

D1 and D2, for instance, propose highly fluorinated ethers as electrolyte solvents or as additives to other electrolytes. In general, these substances are thermally and chemically very stable and have high flash points. However their solvent power is far too low for the required lithium electrolyte salts, so that they cannot be used alone, and they are poorly miscible with conventional battery solvents.

Partially fluorinated carbonates are also described as electrolytes having an increased flash point (D3). The problem here is that the compounds, which apparently are suitable based on their low viscosity, have only a moderately increased flash point (37° C.) and their electrical conductivities are clearly below those of the prior art (assuming that the reported measurements were taken at room temperature which seems likely since no temperature was specified).

Carbamates are also described as thinners for anhydrous electrolytes (D4). They have higher boiling points compared to the currently used thinners, but only marginally improved flash points.

D8 discloses ester compounds of the formula $R^1COOR^2$ as electrolytes for secondary lithium batteries, in which at least one of the groups $R^1$ and $R^2$ has a fluorine substitution. A preferred compound is trifluoroacetic acid methyl ester. However, this compound has a boiling point of only 43° C. and a flash point of −7° C., which presents a high safety risk in case of damage.

According to the present state of the art, reduced flammability of the electrolyte solution is primarily achieved by increasing the viscosity of the electrolyte solution with the aid of binders or fillers or the use of polymer electrolytes, which are practically solid at room temperature.

D5, for instance, describes organic or inorganic thickeners (polyethylene oxide, $SiO_2$, $Al_2O_3$ and others) for solidifying liquid electrolyte solutions.

Polymer electrolytes comprising macromolecules with numerous polar groups, such as polyethylene oxides, as they are known from D6, are also far less flammable due to their low volatility. One also frequently finds diacylated diols or monoacylated diol monoalkyl ethers as the monomer components for producing such a gel-like polymer electrolyte. In these substances the acyl component carries a double bond (i.e., it is, for example, an acrylic acid or methacrylic acid). Examples of such systems include references D11 and D12.

D7 describes polymer electrolytes comprising polar macromolecules formed by polymerization of organophosphorus compounds, which are characterized by their particularly low flammability.

All of these gel-like to solid electrolytes have in common that due to their high viscosity, the mobility of the ions of the salts dissolved in them is far lower than in liquid electrolyte solutions. As a result, particularly at lower temperatures, the conductivities required for most technical applications are no longer attained.

D9 claims esters, such as methyl formate and methyl acetate, as thinner components. From a safety aspect, however, these substances offer no advantages since they also have low flash points and boiling points.

D10 proposes diol diesters as electrolyte components and, among these, especially 1,2-diacetoxyethylene as the preferred substance. Although this substance has clear advantages with respect to its flash point compared to the typical thinners, its viscosity is so high that one of the conventional easily flammable thinners, such as dimethoxyethane, has to be added again to obtain the required conductivity.

Despite the efforts of the prior art, there has remained a need for improved electrolyte systems for secondary lithium batteries.

SUMMARY OF THE INVENTION

Accordingly, it was one object of the invention to provide novel electrolyte solvents for lithium batteries.

Another object of the invention was to provide electrolyte systems which are chemically and physically stable, adequately miscible with other suitable solvents, and adequately dissolve conductive lithium salts.

A further object of the invention was to provide electrolyte systems which have a clearly increased flash point, while nevertheless exhibiting a viscosity and conductivity behavior that makes them suitable in practical applications even at low temperatures.

In addition, in view of the increasing importance of rechargeable lithium cells, is was an object of the invention to provide an electrolyte system whose components would be recyclable in a simple manner.

These and other objects, which are not further defined but are readily apparent or can be derived from the introductory discussion of the prior art, are attained by an electrolyte system of the type described above which has the features described hereinafter.

Advantageous modifications of the electrolyte system according to the invention also are described as preferred embodiments.

The invention also includes a method for enhancing the safety of lithium batteries which provides a solution to the problems underlying the invention.

By providing an electrolyte system for lithium batteries with enhanced safety comprising at least one lithium-containing conductive salt and at least one electrolyte liquid, wherein the electrolyte liquid contains an effective amount of at least one partially fluorinated compound derived from a diol corresponding to formula (I)

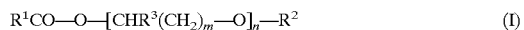

$$R^1CO—O—[CHR^3(CH_2)_m—O]_n—R^2 \qquad (I)$$

wherein $R^1$ is $(C_1–C_8)$ alkyl or $(C_3–C_8)$ cycloalkyl, wherein each of the aforementioned radicals is partially fluorinated or perfluorinated so that at least one hydrogen atom of the radical is replaced by fluorine, $R^2$ is $(C_1–C_8)$ alkyl carbonyl or $(C_3–C_8)$ cycloalkyl carbonyl, wherein each of the aforementioned radicals may optionally be partially fluorinated or perfluorinated, $R^3$ is hydrogen, $(C_1–C_8)$ alkyl or $(C_3–C_8)$ cycloalkyl, m is 0, 1, 2 or 3, and n is 1,2 or 3, it is possible, in a particularly advantageous and not readily foreseeable manner to produce an electrolyte or an electrolyte system, which exceeds, or is at least equivalent to, the known electrolyte systems for lithium batteries within the usual requirement spectrum and at the same time provides increased safety compared to the prior art systems.

In particular, it has surprisingly been found that electrolyte systems for lithium batteries which include a compound of formula (I) meet the following spectrum of characteristics to an excellent degree:

high thermal stability high flash point low vapor pressure high boiling point low viscosity miscibility with the usual solvents used for batteries, particularly with ethylene carbonate, propylene carbonate, diethyl carbonate or lactones, e.g., g-butyrolactone adequate solvent power for fluorine-containing conductive lithium salts, e.g., $LiPF_6$, $LiN(SO_2CF_3)_2$ or $LiC(SO_2CF_3)_3$ high stability to metallic lithium high decomposition voltage excellent properties for the formation of the requisite protective films on the electrodes good solvent power for carbon dioxide: $CO_2$ accelerates the formation of protective films on lithium and $LiC_n$ anodes good solvent power for $SO_2$: $SO_2$ enhances the conductivity over the entire temperature range—which is particularly important at lower temperatures—and the formation of protective films on the electrodes.

Another advantage of the invention is that partially fluorinated compounds according to the invention are generally not miscible with water. For the recycling of used batteries, these components can therefore be readily separated from the water-miscible components, i.e., conductive salts and optionally present carbonate solvents, for purification and reuse.

In the above formula (I), the term "$C_1$–$C_4$ alkyl" should be understood as an unbranched or branched hydrocarbon group with one to four carbon atoms, e.g., a methyl, ethyl, n-propyl, 1-methylethyl, n-butyl, 2-methylpropyl or 1,1-dimethylethyl group.

The term "($C_1$–$C_8$) alkyl" comprises the groups mentioned under the term "($C_1$–$C_4$) alkyl" and, for example, pentyl, 1-methylbutyl, 2-methylbutyl, isopentyl-(3-methylbutyl), 1,2-dimethylpropyl, 1,1-dimethylpropyl, 2,2-dimethylpropyl, 3,3-dimethylpropyl, 1-ethylpropyl, 2-ethylpropyl, n-hexyl, the branched hexyls, particularly, among others, 1-methylpentyl, 2-methylpentyl, 3-methylpentyl, 4-methylpentyl, 1,1-dimethylbutyl, 2,2-dimethylbutyl, 3,3-dimethylbutyl, 1,2-dimethylbutyl, 1,3-dimethylbutyl, 2,3-dimethylbutyl, 1-ethylbutyl, 2-ethylbutyl, 3-ethylbutyl, 1,1,2-trimethylpropyl, 1,2,2-trimethylpropyl, 1-methyl-1-ethylpropyl, 1-ethyl-2-methylpropyl, as well as n-heptyl, n-octyl and the branched heptyl and octyl groups, such as the 1,1,3,3-tetramethylbutyl group;

The term "($C_3$–$C_8$) cycloalkyl" comprises the cyclopropyl, cyclobutyl, cyclopentyl, cyclohexyl, cycloheptyl and cyclooctyl group, and, in addition, the term "($C_3$–$C_8$) cycloalkyl" also comprises those hydrocarbon groups, which are substituted by one or more of the groups named under "($C_1$–$C_4$) alkyl," such as 1-methylcyclohexyl, 2-methylcyclohexyl, 3-methylcyclohexyl, 4-methylcyclohexyl, 1,4-dimethylcyclohexyl, 4-tert-butylcyclohexyl and the like.

The term "($C_1$–$C_4$) alkyl carbonyl" is to be understood as an unbranched or branched hydrocarbon group bonded via a carbonyl group and containing one to four carbon atoms including the carbonyl carbon atom. Examples of such groups include methyl carbonyl, ethyl carbonyl, propyl carbonyl, 1-methylethyl carbonyl and the like.

The term "($C_1$–$C_8$) alkyl carbonyl" comprises the groups cited under the term "($C_1$–$C_4$) alkyl carbonyl" and, for instance, the butyl carbonyl, 2-methylpropyl carbonyl, 1,1-dimethylethyl carbonyl, pentyl carbonyl, 1-methylbutyl carbonyl, 2-methylbutyl carbonyl, isopentyl carbonyl (3-methylbutyl carbonyl), 1,2-dimethylpropyl carbonyl, 1,1-dimethylpropyl carbonyl, 2,2-dimethylpropyl carbonyl, 3,3-dimethylpropyl carbonyl, 1-ethylpropyl carbonyl, 2-ethylpropyl carbonyl, n-hexyl carbonyl, 1-methylpentyl carbonyl, 2-methylpentyl carbonyl, 3-methylpentyl carbonyl, 4-methylpentyl carbonyl, 1,1-dimethylbutyl carbonyl, 2,2-dimethylbutyl carbonyl, 3,3-dimethylbutyl carbonyl, 1,2-dimethylbutyl carbonyl, 1,3-dimethylbutyl carbonyl, 2,3-dimethylbutyl carbonyl, 1-ethylbutyl carbonyl, 2-ethylbutyl carbonyl, 3-ethylbutyl carbonyl, 1,1,2-trimethylpropyl carbonyl, 1,2,2-trimethylpropyl carbonyl, 1-methyl-1-ethylpropyl carbonyl, 1-ethyl-2-methylpropyl carbonyl, and n-heptyl carbonyl groups.

The term "($C_3$–$C_8$) cycloalkyl carbonyl" comprises cyclopropyl, cyclobutyl, cyclopentyl, cyclohexyl, and cycloheptyl groups, which are bonded via a carbonyl group, and, in addition, the term "$C_3$–$C_8$ cycloalkyl" also comprises those groups, which are substituted by one or more of the groups named under "($C_1$–$C_4$) alkyl," e.g., 4-methylcyclohexyl carbonyl and the like.

In the context of the invention, partially fluorinated compounds or groups are compounds or groups in which at least one but not all of the carbon-bonded hydrogen atoms of the corresponding compound or the corresponding group are replaced by fluorine.

In the context of the invention, perfluorinated compounds or groups are compounds or groups in which all carbon-bonded hydrogen atoms of the compound or group are replaced by fluorine.

According to the invention, a solution to the safety problem of secondary lithium batteries is achieved by the use of compounds of formula (I) as essential components of the electrolyte system.

In principle, the compounds of general formula (I) are partially fluorinated diesters derived from diols.

The group $R^1$ of the compounds of formula (I) is essentially a fluorinated group. This means that in group $R^1$ at least one hydrogen is replaced by a fluorine atom. Group $R^1$, however, can also be perfluorinated. Particularly advantageous electrolyte systems are obtained, for instance, with compounds of formula (I) in which group $R^1$ is ($C_1$–$C_4$) alkyl, wherein three and as far as possible up to seven hydrogen atoms are replaced by fluorine atoms. Particularly preferably, $R^1$ is $CF_3$, $CHF_2$ or $CH_2F$. Very advantageously, $R^1$ is $CF_3$.

In compounds of formula (I), the group $R^2$ may be un-fluorinated, partially fluorinated or perfluorinated. An electrolyte system with outstanding performance characteristics results, for instance, with a content of one or more compounds of formula (I) in which $R^2$ is ($C_1$–$C_4$) alkyl carbonyl, wherein optionally, as far as possible, up to five hydrogen atoms are replaced by fluorine atoms. Of particular interest are compounds in which $R^2$ is $CH_3CO$ or $CH_3CH_2CO$ in which, as far as possible, up to five hydrogen atoms may be replaced by fluorine.

In yet another advantageous embodiment the electrolyte system contains compounds of formula (I) in which the group $R^3$ is ($C_1$–$C_4$) alkyl. Especially advantageously, the group $R^3$ is a hydrogen atom or a methyl group.

Also of particular interest are systems containing diesters of formula (I) in which m represents 1.

Highly advantageous systems are also obtained if the electrolyte system contains at least one compound of formula (I) in which n is 1 or 2.

BRIEF DESCRIPTION OF THE DRAWING

The accompanying

DETAILED DESCRIPTION OF PREFERRED EMBODIMENTS

Figure 1:
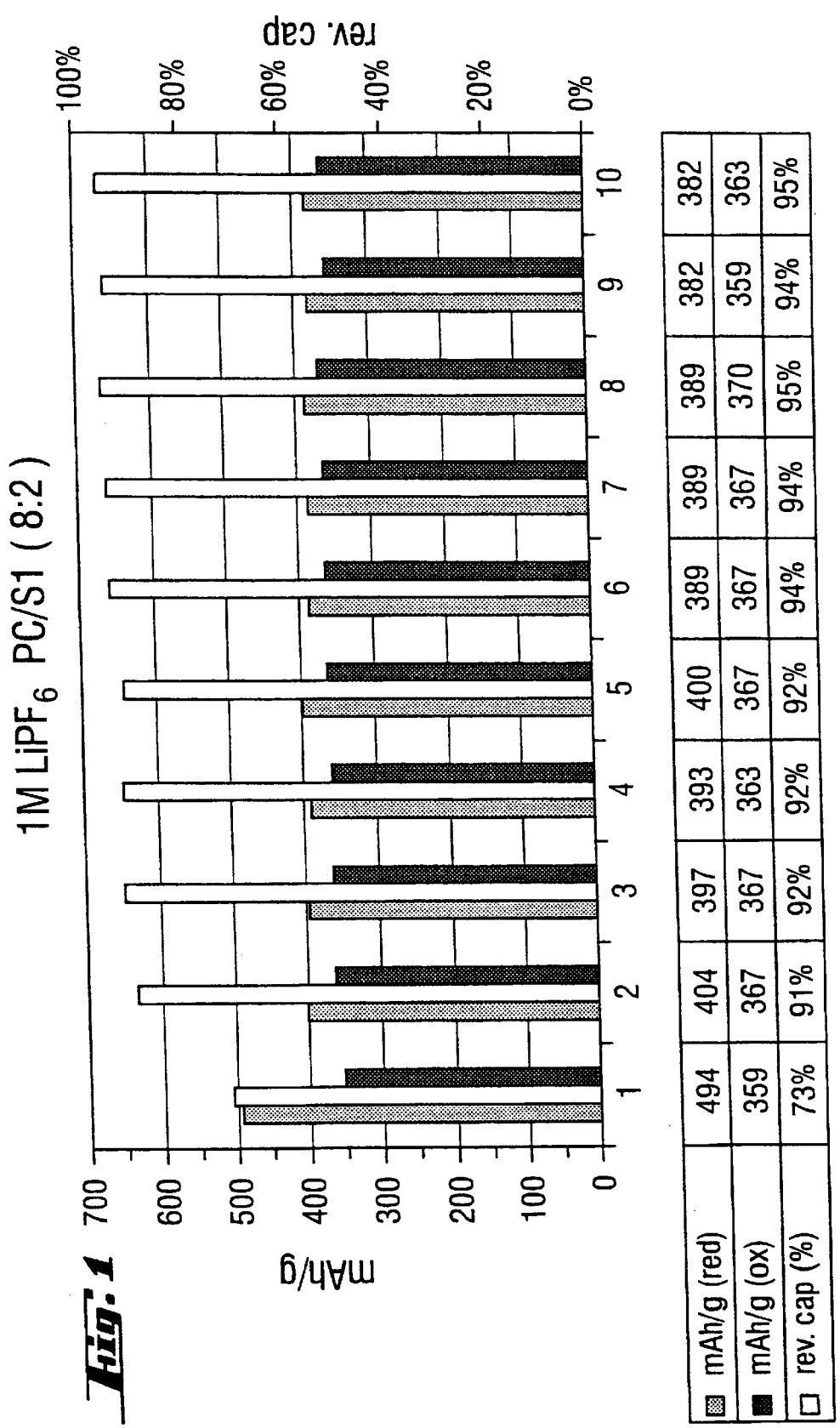
FIG. 1 is a tabulation of the performance of a representative battery using an electrolyte system according to the present invention described in detail in Example 4 over a series of Charging/Discharging Cycles.

Compounds of formula (I) which are particularly useful in the electrolyte system according to the invention include those in which $R^1$, $R^2$, $R^3$, m and n have the following meanings:

| R1 | R2 | R3 | m | n |
| --- | --- | --- | --- | --- |
| $CF_3$ | $CF_3CO$ | H | 1 | 1 |
| $CF_3$ | $CH_3CO$ | H | 1 | 1 |
| $CF_3$ | $CH_2FCO$ | H | 1 | 1 |
| $CF_3$ | $CHF_2CO$ | H | 1 | 1 |
| $CF_3$ | $CF_3CO$ | $CH_3$ | 1 | 1 |
| $CF_3$ | $CH_3CO$ | $CH_3$ | 1 | 1 |
| $CF_3$ | $CH_2FCO$ | $CH_3$ | 1 | 1 |
| $CF_3$ | $CHF_2CO$ | $CH_3$ | 1 | 1 |
| $CF_3$ | $CF_3CO$ | H | 1 | 2 |
| $CF_3$ | $CH_3CO$ | H | 1 | 2 |
| $CF_3$ | $CH_2FCO$ | H | 1 | 2 |
| $CF_3$ | $CHF_2CO$ | H | 1 | 2 |
| $CF_3$ | $CF_3CO$ | $CH_3$ | 1 | 2 |
| $CF_3$ | $CH_3CO$ | $CH_3$ | 1 | 2 |
| $CF_3$ | $CH_2FCO$ | $CH_3$ | 1 | 2 |
| $CF_3$ | $CHF_2CO$ | $CH_3$ | 1 | 2 |

The substances of general formula I may be used as thinners for fire-resistant, viscous components, for instance, ethylene carbonate and propylene carbonate. This makes it possible to produce aprotic electrolyte systems that are scarcely flammable.

The electrolyte systems for lithium batteries with enhanced safety, which comprise at least one lithium-containing conductive salt and at least one electrolyte liquid contain an "effective amount" of one or more compounds of formula (I). In the context of the invention, this is to be understood as an amount of a compound of formula (I) derived from diols, which is sufficient to construct a serviceable and functional secondary lithium battery.

In a special embodiment of the invention, the content of diol derivatives of formula (I) is 2 to 100%, preferably 3 to 30% by volume in relation to the total volume of the electrolyte system. In other words, the diesters of formula (I) derived from diols can be used either as the sole solvent or as a thinner of a secondary lithium battery.

If the proportion of the diol derivatives of formula (I) to be used according to the invention in the electrolyte system of a secondary lithium battery is less than 2% by volume, the aforementioned advantages are not as pronounced. Typically, the content is 2 to 50% by volume, and preferably 3 to 30% by volume, relative to the total volume of the electrolyte system.

Advantageously, the compounds according to formula (I) are not generally used alone in pure form as safety electrolyte liquids for non-aqueous battery systems. Rather, they are used in combination with known electrolyte liquids, such as carbonates, esters, lactones, nitriles and the like as electrolyte liquid systems or combinations, or they may contain certain additives (for example, certain gases) to further increase the conductivity over the entire temperature range and further improve the film formation on the electrodes.

Based on the above discussion, highly advantageous modifications of the electrolyte system according to the invention are obtained, if besides the content of at least one diol of general formula (I), an additional content of ethylene carbonate and/or propylene carbonate is present.

In a further, highly advantageous modification of the electrolyte systems according to the invention, a partially fluorinated carboxylic acid amide, e.g., trifluoroacetic acid N,N-dimethyl amide, is present in the electrolyte liquid in addition to the at least one diol of formula (I) and the ethylene carbonate and/or propylene carbonate contained therein.

The partially fluorinated diol derivatives according to Formula (I) also enhance the solvent power for non-polar or slightly polar gases, particularly $CO_2$, $N_2$, $N_2O$, $SF_6$, $SO_2FCl$ or $SO_2F_2$. These gases can advantageously be used as a protective gases in lithium batteries, since they have a positive effect on the reactions occurring at the electrode-felectrolyte interface [cf. J. O. Besenhard et al., J. Power Sources, 44 (1993), 413].

The electrolyte systems according to the invention are therefore of particular interest also for secondary lithium batteries in which $SO_2$ or $CO_2$ is used as a protective gas, respectively systems that are saturated with $SO_2$ or $CO_2$. This supports a distinctly advantageous protective film formation on the electrodes.

Particularly advantageous systems also result if the system comprises at least one conductive salt, at least one partially fluorinated diol of formula (I), ethylene carbonate and/or propylene carbonate, and $SO_2$ or $CO_2$.

The compounds of formula (I) can in part be synthesized according to methods known from the literature or produced according to modified methods of the literature, and are thus available.

The following Table 1 summarizes some examples of the physical properties of diol esters. Compounds 2 and 3 as well as 5 and 6 are given as comparison substances.

TABLE 1

| Compound No. | Boiling Point °C. | Flash Point °C. | Viscosity mm²/sec |
| --- | --- | --- | --- |
| 1 | 157 | >110 | 1.44 |
| 2 | 186 | 97 | 2.28 |
| 3 | 138 | 41 | 0.73 |
| 4 | 202 | >110 | 2.66 |
| 5 | 132 | 86 | 1.17 |
| 6 | 163 | 83 | 1.54 |

1: 1,2-bis(trifluoroacetoxy) ethane
2: 1,2-bis(acetoxy) ethane
3: 1-acetoxy-2-methoxy ethane
4: bis(2-trifluoroacetoxy) diethyl ether
5: 1-trifluoroacetoxy-2-trifluoroethoxy ethane
6: 1-acetoxy-2-trifluoroethoxy ethane The invention also includes secondary lithium batteries with enhanced safety which contain an electrolyte system according to the invention.

The invention also provides a method for enhancing the safety of a secondary lithium battery, which method comprises using an electrolyte system according to the invention as the electrolyte in the battery.

Finally, the scope of the invention also embraces the use of compounds of formula (I) as a safety electrolyte system for or in safety electrolyte systems of lithium batteries.

The following examples serve to illustrate the invention without limiting its scope.

To produce the electrolyte, the solvent components used therein were first prepared as follows:

Ethylene carbonate (>99%, Merck) was distilled in an oil pump vacuum (boiling point 85° to 95° C.); dehydrated for 3 days at 150° C. using an activated molecular sieve (Roth, pore size of 4 angstrom), and stored at 60° C. under dried argon. The argon, 99.996%, AGA, was first directed over copper-(I)-oxide [BASF] reduced with argon W5 [mixture of 95% argon and 5% hydrogen, technical grade, AGA] at 150° C. to remove oxygen traces and then dried over an activated molecular sieve.

Propylene carbonate (purum, Aldrich) was distilled in an oil pump vacuum over a 1.5 m long metal-coated packed column (boiling point 64° to 66° C.) and stored at room temperature over an activated molecular sieve under dried argon. After purification and drying, the residual water content of the solvents was determined by the Karl-Fischer method (e.g., using the Mitsubishi CA 05 automatic titration device). The water content should be less than 15 ppm.

The fluorinated solvent component was dried for a few days at room temperature over an activated molecular sieve under dried argon.

The electrolyte solutions were produced by the Schlenk technique in a dried argon stream. The glass equipment which was used with protective gas connection was freed from any adhering moisture prior to use in a non luminous Bunsen burner flame, while repeatedly alternating argon purging and oil pump vacuum suction.

EXAMPLE 1

Production of a safety battery electrolyte composed of 1,2-bis(trifluoroacetoxy) ethane (Compound 1 from Table 1)/propylene carbonate (1:1).

28.7 g of lithium bis(trifluoromethanesulfonyl) imide (0.1 mol) was dissolved in a 1:1 (V/V) mixture of 1,2-bis (trifluoroacetoxy) ethane and propylene carbonate (PC) and thereafter made up to a volume of 100 ml by adding the same mixture. The conductivity of this electrolyte was measured at −30° to +60° C. The results are shown in Table 2.

EXAMPLE 2

Production of a safety battery electrolyte composed of 1,2-bis(trifluoroacetoxy) ethane/propylene carbonate (1:1) with lithium hexafluorophosphate.

The electrolyte was produced in the same manner as in Example 1, except that $LiPF_6$ was used as the electrolyte salt. The conductivity of this electrolyte was determined at −30° to +60° C. The results are shown in Table 2.

EXAMPLE 3

Production of a safety battery electrolyte composed of 1,2-bis(trifluoroacetoxy) ethane/propylene carbonate (1:1) with added sulfur dioxide gas and lithium-bis (trifluoromethanesulfone) imide.

28.7 g (0.1 mol) of the imide was dissolved in 80 ml of the 1:1 mixture of 1,2-bis(trifluoroacetoxy) ethane/ propylene carbonate saturated with $SO_2$ gas and subsequently made up to a volume of 100 ml with additional $SO_2$ saturated amide. The conductivity of the resulting electrolyte was determined at −30° to +60° C. The results are shown in Table 2.

TABLE 2

| | Conductivity [mS/cm] | | | |
|---|---|---|---|---|
| Example No. | −20 [° C.] | 0 [° C.] | 25 [° C.] | 40 [° C.] |
| 1 | 0.8 | 1.3 | 2.6 | 3.4 |
| 2 | 0.9 | 1.8 | 3.7 | 5.5 |
| 3 | 1.4 | 2.9 | 4.7 | 6.8 |

EXAMPLE 4

Production of a safety battery electrolyte composed of 1,2-bis(trifluoroacetoxy) ethane/propylene carbonate 20:80 with lithium hexafluorophosphate.

The electrolyte was produced in the same manner as in Example 2 except that 1,2-bis(trifluoroacetoxy) ethane was used here only as an additive in a proportion of 20%. FIG. 1 shows the behavior of the electrolyte cell over 10 charging/discharging cycles.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An electrolyte system for lithium batteries comprising at least one lithium-containing conductive salt and at least one electrolyte liquid, wherein said electrolyte liquid comprises an effective amount of at least one partially fluorinated compound derived from a diol corresponding to formula (I):

$$R^1CO\text{—}O\text{—}[CHR^3(CH_2)_m\text{—}O]_n\text{—}R^2 \qquad (I)$$

wherein
 $R^1$ is a $(C_1-C_8)$ alkyl group or a $(C_3-C_8)$ cycloalkyl group, wherein each of said groups is partially fluorinated or perfluorinated so that at least one hydrogen atom of the group is replaced by fluorine;
 $R^2$ is a $(C_1-C_8)$ alkyl carbonyl or $(C_3-C_8)$ cycloalkyl carbonyl group, wherein said alkylcarbonyl or cycloalkylcarbonyl group may optionally be partially fluorinated or perfluorinated;
 $R^3$ is a hydrogen atom or a $(C_1-C_8)$ alkyl or $(C_3-C_8)$ cycloalkyl group;
 m is 0, 1, 2 or 3, and
 n is 1, 2 or 3.

2. An electrolyte system according to claim 1, wherein $R^1$ represents a $(C_1-C_4)$ alkyl group in which from three to seven hydrogen atoms are replaced by fluorine.

3. An electrolyte system according to claim 1, wherein $R^2$ represents a $(C_1-C_4)$ alkyl carbonyl group in which from 0 to 5 hydrogen atoms are replaced by fluorine.

4. An electrolyte system according to claim 1, wherein $R^3$ represents a $(C_1-C_4)$ alkyl group.

5. An electrolyte system according to claim 1, wherein m represents 1.

6. An electrolyte system according to claim 1, wherein n is 1 or 2.

7. An electrolyte system according to claim 1, wherein $R^1$ represents $CF_3$, $CHF_2$ or $CH_2F$.

8. An electrolyte system according to claim 1, wherein $R^2$ represents $CH_3CO$ or $CH_3CH_2CO$ in which from 1 to 5 hydrogen atoms are replaced by fluorine.

9. An electrolyte system according to claim 1, wherein $R^3$ represents a hydrogen atom or a methyl group.

10. An electrolyte system according to claim 1, wherein $R^1$ represents $CF_3$, $R^2$ represents $CF_3CO$, $R^3$ represents hydrogen or methyl, m is 1, and n is 1 or 2.

11. An electrolyte system according to claim 1, comprising from 2 to 100% by volume of said compound of formula (I), relative to the total volume of the electrolyte system.

12. An electrolyte system according to claim 11, comprising from 2 to 50% by volume of said compound of formula (I), relative to the total volume of the electrolyte system.

13. An electrolyte system according to claim 12, comprising from 3 to 30% by volume of said compound of formula (I), relative to the total volume of the electrolyte system.

14. An electrolyte system according to claim 1, further comprising at least one substance selected from the group consisting of carbonates, esters, lactones and nitriles.

15. An electrolyte system according to claim 14, wherein said at least one substance is selected from the group consisting of ethylene carbonate and propylene carbonate.

16. An electrolyte system according to claim 1, wherein said electrolyte system is saturated with $SO_2$ or $CO_2$.

17. A method for enhancing the safety of a secondary lithium battery, said method comprising incorporating in said battery an electrolyte system according to claim 1.

18. A secondary lithium battery containing an electrolyte system comprising at least one lithium-containing conductive salt and at least one electrolyte liquid, wherein said electrolyte liquid comprises an effective amount of at least one partially fluorinated compound derived from a diol corresponding to formula (I):

$$R^1CO\!-\!O\!-\![CHR^3(CH_2)_m\!-\!O]_n\!-\!R^2 \qquad (I)$$

wherein $R^1$ is a $(C_1\!-\!C_8)$ alkyl group or a $(C_3\!-\!C_8)$ cycloalkyl group, wherein each of said groups is partially fluorinated or perfluorinated so that at least one hydrogen atom of the group is replaced by fluorine;

$R^2$ is a $(C_1\!-\!C_8)$ alkyl carbonyl or $(C_3\!-\!C_8)$ cycloalkyl carbonyl group, wherein said alkylcarbonyl or cycloalkylcarbonyl group may optionally be partially fluorinated or perfluorinated;

$R^3$ is a hydrogen atom or a $(C_1\!-\!C_8)$ alkyl or $(C_3\!-\!C_8)$ cycloalkyl group;

m is 0, 1, 2 or 3, and n is 1, 2 or 3.

19. A method of preparing an electrolyte system for a lithium battery comprising at least one lithium-containing conductive salt and at least one electrolyte liquid, said method comprising incorporating in said electrolyte liquid an effective amount of at least one partially fluorinated compound derived from a diol corresponding to formula (I):

$$R^1CO\!-\!O\!-\![CHR^3(CH_2)_m\!-\!O]_n\!-\!R^2 \qquad (I)$$

wherein $R^1$ is a $(C_1\!-\!C_8)$ alkyl group or a $(C_3\!-\!C_8)$ cycloalkyl group, wherein each of said groups is partially fluorinated or perfluorinated so that at least one hydrogen atom of the group is replaced by fluorine;

$R^2$ is a $(C_1\!-\!C_8)$ alkyl carbonyl or $(C_3\!-\!C_8)$ cycloalkyl carbonyl group, wherein said alkylcarbonyl or cycloalkylcarbonyl group may optionally be partially fluorinated or perfluorinated;

$R^3$ is a hydrogen atom or a $(C_1\!-\!C_8)$ alkyl or $(C_3\!-\!C_8)$ cycloalkyl group;

m is 0, 1, 2 or 3, and n is 1, 2 or 3.

* * * * *